United States Patent [19]

Bianco

[11] Patent Number: 4,577,880
[45] Date of Patent: Mar. 25, 1986

[54] THEFT PREVENTION APPARATUS FOR SHOPPING CARTS

[76] Inventor: Eric L. Bianco, 448 W. Second Ave., Roselle, N.J. 07203

[21] Appl. No.: 568,720

[22] Filed: Jan. 6, 1984

[51] Int. Cl.$^4$ ............................................. B62D 39/00
[52] U.S. Cl. ............................ 280/33.99 C; 188/1.12; 188/31; 188/69; 188/163
[58] Field of Search ................... 280/33.99 C, DIG. 4; 188/7, 31, 110, 111, 5, 163, 1.12, 69; 340/51, 568, 571; 180/287; 194/4 C

[56] References Cited

U.S. PATENT DOCUMENTS

| | | | |
|---|---|---|---|
| 3,031,037 | 4/1962 | Stollman | 280/33.99 C |
| 3,031,038 | 4/1962 | Chait | 280/33.99 C |
| 3,117,655 | 1/1964 | Skupas et al. | 280/33.99 C |
| 3,356,185 | 12/1967 | Isaacks | 280/33.99 C |
| 3,495,688 | 2/1970 | Isaacks | 280/33.99 C |
| 3,652,103 | 3/1972 | Higgs | 188/31 |
| 3,892,295 | 7/1975 | Hahto | 280/33.99 C |
| 4,199,043 | 4/1980 | Lankester et al. | 280/33.99 C |
| 4,242,668 | 12/1980 | Herzog | 280/33.99 C |

Primary Examiner—David M. Mitchell
Assistant Examiner—Eric Culbreth
Attorney, Agent, or Firm—Daniel H. Bobis

[57] ABSTRACT

Theft-prevention apparatus for a shopping cart of the type having a carriage body, a plurality of wheels and a plurality of wheel support yokes secured to the carriage body for rotatably supporting the plurality of wheels, including a pin extending from one of the wheels; a ball movable between a first inoperative position and a second operative position at which the ball is engageable with the pin; a plate secured to the respective wheel support yoke and having a cut-out section defining an aperture; a ball support cage having an inclined surface for supporting the ball at the first inoperative position out of alignment with the aperture such that said ball rests against the plate; and a solenoid secured to the plate for moving the ball support cage to a position adjacent the aperture in response to movement of the shopping cart in the proximity of a predetermined magnetic field to cause the ball to move from the first inoperative position through the aperture to the second operative position, such that the ball is wedged between the plate and the pin upon continued rotation of the respective wheel to prevent further rotation thereof.

6 Claims, 8 Drawing Figures

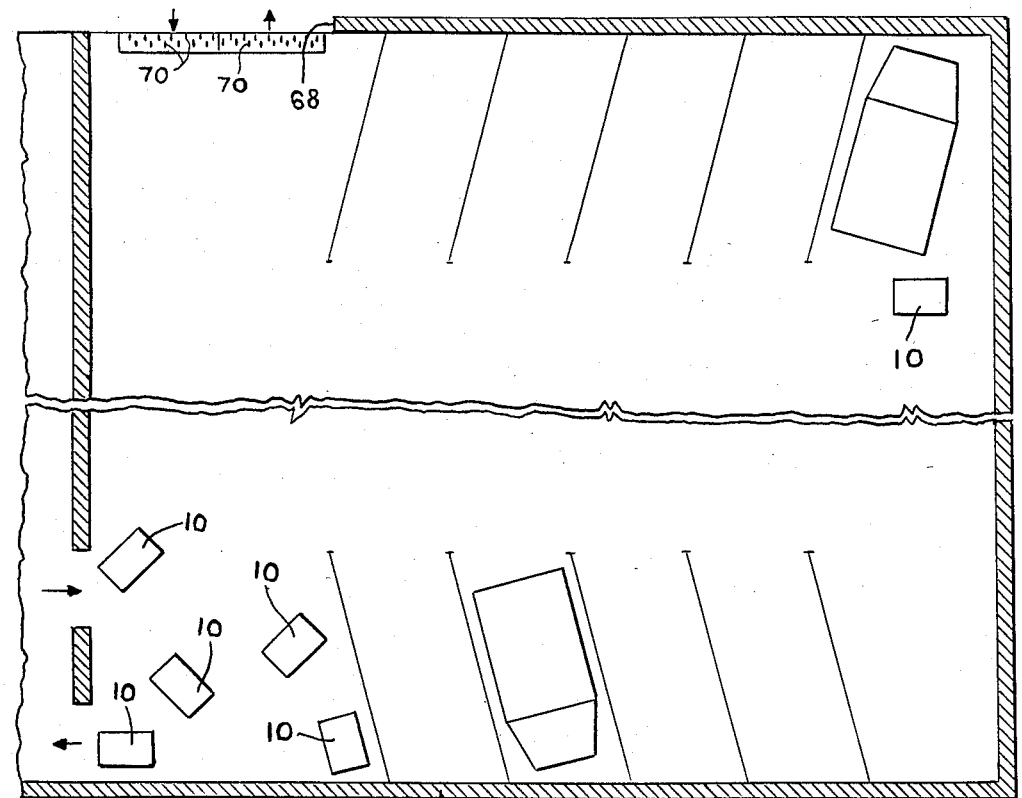
FIG. 1
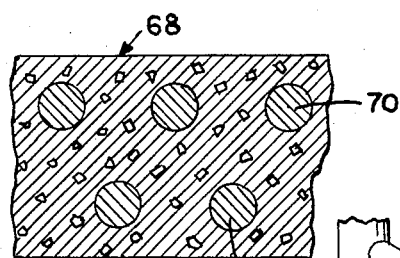
FIG. 1a
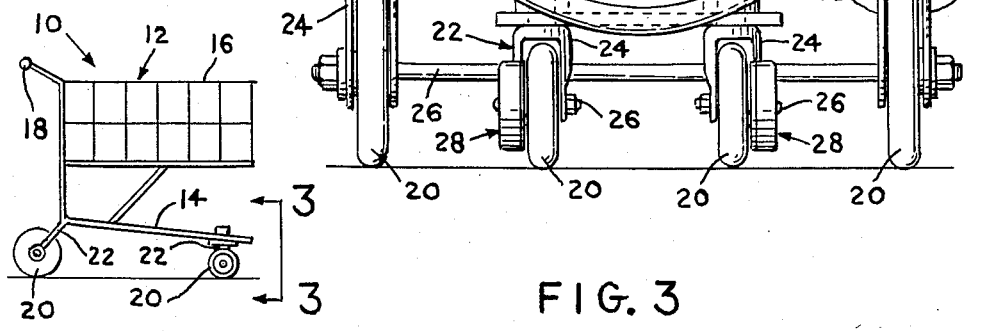
FIG. 2
FIG. 3

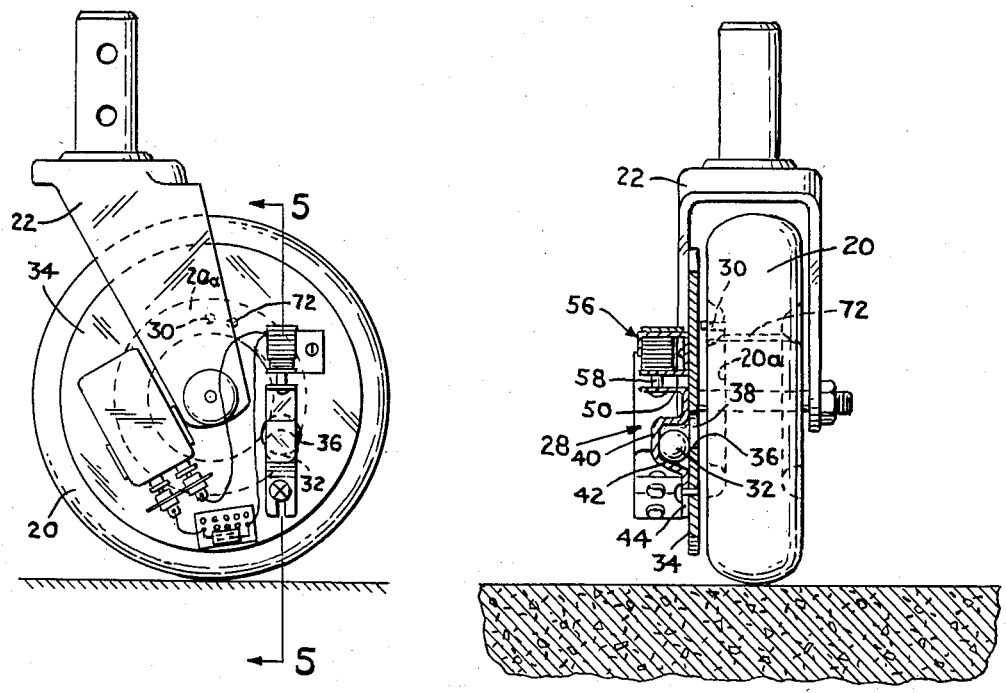
FIG. 4
FIG. 5
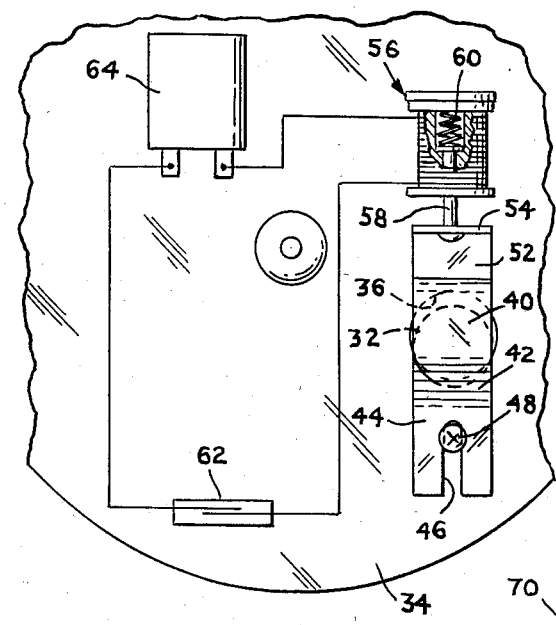
FIG. 7
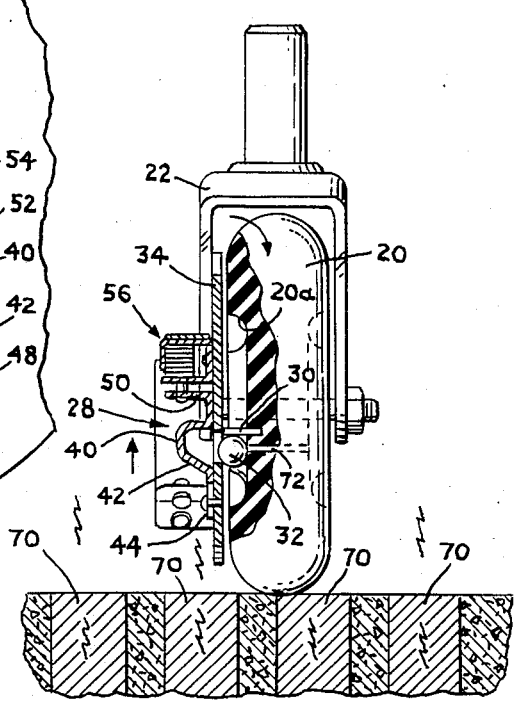
FIG. 6

4,577,880

THEFT PREVENTION APPARATUS FOR SHOPPING CARTS

BACKGROUND OF THE INVENTION

This invention relates generally to shopping carts and, more particularly, is directed to theft-prevention apparatus for shopping carts.

In view of the relatively expensive nature of shopping carts, generally in the range of hundreds of dollars for each shopping cart, and the large number of shopping carts that are stolen each year, theft of shopping carts poses a serious problem for stores. Thus, a large supermarket chain having many stores may lose millions of dollars each year due to shopping cart thefts.

As a result, various schemes have been proposed to prevent such thefts. For example, various stores have installed poles around a small area in front of the store which are spaced apart to permit the customers to enter and leave the store but which do not permit removal of shopping carts from such area. This arrangement, however, has the disadvantage that the customers cannot push the shopping carts to their cars in the parking area of the store, but rather, the customers must park their car in front of the poled access area and remove the packages thereat from the shopping cart. Such system results in customer dissatisfaction and a congestion of cars at the entrance and/or exit of the store. Also such a barrier poses a fire safety violation in many areas.

It has also been proposed to provide a sensor on each shopping cart which activates a signal device which, in turn, emits a warning sound when the shopping cart is removed from the premises of the store and/or its parking area. However, such system does not prevent the theft of shopping carts, but only warns of an impending theft. In other words, with such arrangement, an employee of the store is still required to chase the theft suspect which could, of course, present a danger. Such arrangement thereby promotes confrontation between the employee and the thief, and also requires employee time to monitor the system, resulting in additional costs.

Another theft-prevention system is shown and described in U.S. Pat. No. 4,242,668 to Herzog. As described therein, short range radio signal transmitters are disposed on a fence enclosing a vehicle parking area next to a store. When a shopping cart is moved within about ten feet thereof, means on the cart is activated to cause collapse of the front end of the shopping cart, thereby automatically immobilizing the cart.

OBJECTS AND SUMMARY OF THE INVENTION

Accordingly, it is an object of the present invention to provide novel theft-prevention apparatus for a shopping cart.

More particularly, it is an object of the present invention to provide theft-prevention apparatus for a shopping cart which prevents movement of at least one wheel thereof with which it is associated.

It is another object of the present invention to provide theft-prevention apparatus for a shopping cart which is passive in nature and thereby requires low maintenance.

It is still another object of this invention to provide theft-prevention apparatus for a shopping cart which is relatively inexpensive to manufacture and utilize.

In accordance with an aspect of this invention, theft-prevention apparatus for a shopping cart of the type having body means, a plurality of wheels and wheel support means secured to the body means for rotatably supporting the plurality of wheels, includes stopper means secured to one of the wheels; engagement means movable between a first inoperative position and a second operative position at which the engagement means is engagable with the stopper means; and actuator means secured to the wheel support means for controlling movement of the engagement means from the first inoperative position to the second operative position for engagement with the stopper means in response to movement of the shopping cart in the proximity of a predetermined magnetic field to prevent rotation of the respective one of the wheels.

More particularly, in accordance with the present invention, theft-prevention apparatus for a shopping cart of the type having body means, a plurality of wheels and wheel support means secured to the body means for rotatably supporting the plurality of wheels, includes pin means extending from one of the wheels; ball means movable between a first inoperative position and a second operative position at which the ball means is engageable with the pin means; plate means secured to the wheel support means and having a cut-out section defining an aperture; ball support means having an inclined surface for supporting the ball means at the first inoperative position out of alignment with the aperture such that the ball means rests against the plate means; and solenoid means secured to the plate means for moving the ball support means to a position adjacent the aperture in response to movement of the shopping cart in the proximity of the predetermined magnetic field to cause the ball means to move from the first inoperative position through the aperture to the second operative position, such that the ball means is wedged between the plate means and the stopper means upon continued rotation of the respective one of the wheels to prevent further rotation thereof.

The above, and other, objects, features and advantages of the present invention will become readily apparent from the following detailed description thereof which is to be read in conjunction with the accompanying drawings.

BRIEF DESCRIPTION OF THE DRAWINGS

FIG. 1 is a top plan view of a restricted parking area out of which shopping carts are not to pass;

FIG. 1a is an enlarged cross-sectional view of the entrance/exit area of the parking area of FIG. 1, illustrating the spaced magnets which are embedded in the ground thereat;

FIG. 2 is a side elevational view of a shopping cart with which the present invention can be utilized;

FIG. 3 is a rear elevational view of the lower portion of the shopping cart of FIG. 2;

FIG. 4 is a side elevational view of theft-prevention apparatus according to one embodiment of the present invention in association with one wheel of the shopping cart of FIG. 2;

FIG. 5 is a partial, cross-sectional view of the theft-prevention apparatus of FIG. 4, taken along line 5—5 thereof, and its associated wheel, in the operative state thereof;

FIG. 6 is a partial, cross-sectional view of the theft-prevention apparatus of FIG. 5 and its associated wheel, in the theft-prevention state thereof; and FIG. 7 is an enlarged schematic view of a portion of the theft-prevention apparatus of FIG. 4.

DETAILED DESCRIPTION OF THE PREFERRED EMBODIMENTS

Referring to the drawings in detail, and initially to FIGS. 2 and 3 thereof, a shopping cart 10 with which the present invention can be used includes a main body 12 which is formed, for example, of a lower support chassis 14, a basket 16 for holding packages and the like connected to and supported by lower support chassis 14 and a handle 18 secured at one end of basket 16 by which the customer can push the shopping cart. Shopping cart 10 also includes a plurality of, for example, four, wheels 20 and wheel support yokes 22 secured to lower support chassis 14 at spaced locations and each of which rotatably supports a respective one of the wheels 20. For example, each wheel support yoke 22 may be formed with a bifurcated end 24 having two spaced legs 24a and 24b. Each wheel 20 is rotatably mounted between the spaced legs 24a and 24b of the respective wheel support yoke 22 by means of an axle.

In accordance with the present invention, theft-prevention apparatus 28 is associated with at least one of the wheels 20 of shopping cart 10. In the embodiment shown in FIG. 3, theft-prevention apparatus 28 according to the present invention is associated with the two front wheels 20 of shopping cart 10.

As shown more particularly in regard to FIGS. 4-7, the theft-prevention apparatus 28 according to one embodiment of the present invention generally includes stopper means secured to each associated wheel, engagement means movable between a first inoperative position and a second operative position at which the engagement means is engageable with the stopper means, and actuating means secured to the associated wheel support yoke for controlling movement of the engagement means from the first inoperative position to the second operative position for engagement with the stopper means in response to movement of the shopping cart in the proximity of a predetermined magnetic field to prevent rotation of the respective wheel.

More particularly, and with respect to only one front wheel shown in FIGS. 4-7, the stopper means includes an eccentrically-located pin 30 which is secured to the respective wheel 20 within the circular recess 20a thereof and which extends radially outward therefrom.

The engagement means is comprised of a small durable ball 32, for example, made of metal or a similar material.

The actuator means includes a support plate 34 mounted on one of the spaced legs 24a or 24b of the respective wheel support yoke 22 so as to be generally parallel to wheel 20. Support plate 34 includes a circular cut-out section 36 which defines an aperture 38 therethrough. A non-ferrous cage 40 of the actuator means is provided for supporting ball 32 and is slidably movable along plate 34 in relation to aperature 38. As shown in FIGS. 5 and 6, cage 40 includes a lower support surface 42 which is downwardly inclined toward mounting plate 34. Cage 40 is also open at the side facing mounting plate 34. In this regard, when cage 40 is in an inoperative position offset from aperture 38, as shown in FIG. 5, ball 32 cannot pass through aperture 38, and thereby rests upon inclined surface 42 and against mounting plate 34.

On the other hand, in the theft-prevention state, as will be described in greater detail hereinafter, and as shown in FIG. 6, cage 40 is positioned adjacent aperature 38, whereby ball 32 is forced by gravity down inclined surface 42 and through aperture 38 to the opposite side of mounting plate 34 such that ball 32 is substantially positioned within circular recess 20a of the respective wheel 20. In this position, it is to be appreciated that at least a portion of ball 32 remains within the cut-out section 36 of mounting plate 34, that is, regardless of rotation of wheel 20, ball 32 does not rotate with wheel 20, but rather, is restrained from rotating by the cut-out section 36.

As previously discussed, cage 40 is movable in the vertical direction along mounting plate 34 with respect to aperture 38 thereof and, to this end, cage 40 includes a lower flange 44 which is flush with the outer surface of mounting plate 34 and which, as shown in FIGS. 4 through 7 includes an elongated cut-out section 46 which defines a slot through which a bolt is secured to mounting plate 34. Cage 40, at its upper end, includes an L-shaped flange 50 formed of a first leg 52 which is flush with and slides along mounting plate 34 and a second leg 54 which extends in a direction radially outward from mounting plate 34 and is secured to the free end of first leg 52.

In accordance with the present invention, the actuator means also includes a solenoid 56 having a reciprocable rod 58, the free end of which is secured to second leg 54 of L-shaped flange 50. Reciprocable rod 58 is normally biased in the outward or downwardly-extending direction of FIG. 7 by a compression spring 60 and, upon actuation of solenoid 56, rod 58 is pulled in the upward direction of FIG. 7 against the biasing force of spring 60.

Thus, in the normal operating state of the apparatus, solenoid 56 is not actuated, whereby spring 60 biases reciprocable rod 58 outwardly such that cage 40 is moved to the inoperative position of FIG. 5. In this state, since cage 40 is not directly in line with aperture 38, ball 32 cannot pass through aperture 38. Accordingly, the shopping cart can be utilized in its normal mode of operation. On the other hand, when solenoid 56 is actuated to pull in rod 58 against the biasing force of spring 60, cage 40 is moved into alignment with aperture 38 such that ball 32 passes through aperture 38 to the position shown in FIG. 6.

In accordance with the present invention, solenoid 56 is actuated in its theft-prevention state when shopping cart 10 is pushed in the proximity of a predetermined magnetic field. In this regard, a Reed switch 62 is provided such that when shopping cart 10 is moved in the proximity of such predetermined magnetic field, Reed switch 62 closes so that power from a power supply 64, such as a battery, is supplied to solenoid 56 to actuate the latter. As a result, cage 40 is moved to the position shown in FIG. 6.

It is to be appreciated that Reed switch 62 should be closed only during an attempted theft of the shopping cart. In other words, when shopping cart 10 is moved anywhere within the store or the parking area, Reed switch 62 should not be closed and solenoid 56 should not be actuated. To this end, a fence, wall or the like 66 is provided in surrounding relation to the parking area with an entrance/exit area 68 being provided for entry and exiting of vehicles to and from the parking area. Since the shopping cart 10 can only be stolen through such entrance/exit area 68, a predetermined magnetic field for actuating Reed switch 62 need only be positioned thereat.

As one embodiment that can be utilized, a plurality of cylindrical permanent magnets 70 are embedded within the ground at the entrance/exit area 68 flush with the upper surface thereof. In this manner, when there is an attempted theft of the shopping cart, Reed switch 62 is closed to actuate solenoid 56 so that cage 40 is moved to the position shown in FIG. 6. As a result, ball 32 passes through opening 38 to the opposite side of mounting plate 34. Upon continued movement of shopping cart 10, and thereby upon continued rotation of the respective wheel 20, pin 30 is rotated into engagement with ball 32 so that, as shown in FIG. 6, ball 32 is wedged between pin 30 and cut-out section 36 of mounting plate 34. Since pin 30 is prevented from rotating further, wheel 20 is locked and also prevented from rotating, thereby foiling the theft attempt.

It is to be appreciated that the spacing between permanent magnets 70 depends on the length and circumference of the magnets and the size of the magnetic field created by the magnets.

It is to be noted that, after shopping cart 10 is rotated to the position where pin 30 engages ball 32, Reed switch 62 is no longer positioned in the proximity of permanent magnets 70 and thereby opens so as to disconnect the supply of power to solenoid 56. As a result, spring 60 biases reciprocable rod 58 to the position shown in FIGS. 4, 5 and 7. In such state, since cage 40 is no longer in alignment with aperture 38, ball 32 is prevented from reentering cage 40 through aperture 38. In other words, even if wheel 20 is rotated in the reverse direction so as to free ball 32, the latter cannot return to cage 40.

It is to be appreciated that the present invention provides a passive system for theft-prevention of shopping carts. With the present arrangement, there is a low maintenance cost and low energy cost.

In order to prevent tampering with the theft-prevention apparatus according to the present invention, a cover is provided which is secured to the apparatus with a tamper resistant screw, that is, a screw which can only be tightened and not loosened. In this manner, the cover is not removable from the apparatus.

It is to be appreciated that various modifications within the scope of claims can be made by one of ordinary skill in the art within the scope of the present invention. For example, although cylindrical spaced magnets have been disclosed, it may also be possible to utilize iron channels which are buried flush with the surface of the ground. Still further, coiled elements can be embedded in the ground and energized only when needed during normal business operation.

In order to return the shopping cart to its normal operating condition, shopping cart 10 is turned upside down, or the front end of the shopping cart is lifted off the ground to provide free rotation of the respective wheel 20. Solenoid 56 is then actuated to cause movement of cage 40 into alignment with aperture 38. Wheel 20 is provided with a through bore 72 which is adjacent pin 30 and through which an instrument can be inserted to force ball 32 through aperture 38 into cage 40. Thereafter, Reed switch 62 is opened by removing the shopping cart from the forced magnetic field so that return spring 60 causes cage 40 to move to the inoperative position shown in FIG. 5.

Still further, it is to be appreciated that the present invention is not limited to the cage and ball assembly shown in the drawings. For example, solenoid 56 may be positioned in a direction transverse to that shown in the FIGURES, with reciprocable rod 58 extendible through aperture 38 for engagement with pin 30. In such case, a pawl can be provided to lock reciprocable rod 58 in an extended position when solenoid 56 is actuated. It is to be appreciated that, in such case, actuation of solenoid 56 would result in reciprocable rod 58 being biased outwardly, and a return spring would be provided for pulling reciprocable rod 58 back during opening of Reed switch 62.

Having described specific preferred embodiments of the invention with reference to the accompanying drawings, it is to be understood that the present invention is not limited to those precise embodiments, and that various changes and modifications may be effected therein by one of ordinary skill in the art without departing from the spirit and scope of the present invention as defined by the appended claims.

What is claimed is:

1. Theft-prevention apparatus for a shopping cart of the type having body means, a plurality of wheels and wheel support means secured to said body means for rotatably supporting said plurality of wheels, said apparatus comprising:
   a. stopper means secured to one of said wheels;
   b. engagement means movable between a first inoperative position and a second operative position at which said engagement means is engageable with said stopper means, said engagement means including ball means movable between said first inoperative position and said second operative position at which said ball means is engageable with said stopper means; and
   c. actuator means secured to said wheel support means for controlling movement of said engagement means from said first inoperative position to said second operative position for engagement with said stopper means in response to movement of said shopping cart in the proximity of a predetermined magnetic field to prevent rotation of said one of said wheels, said actuator means including plate means secured to said wheel support means and having a cut-out section defining an aperture, ball support means for supporting said ball means at said first inoperative position, and solenoid means secured to said plate means for moving said ball support means to a position adjacent said aperture in response to movement of said shopping cart in the proximity of said predetermined magnetic field to cause said ball means to move from said first inoperative position through said aperture to said second operative position, such that said ball means is wedged between said plate means and said stopper means upon continued rotation of said one of said wheels to prevent further rotation thereof.

2. Theft-prevention apparatus according to claim 1; in which said ball support means has an inclined support surface for supporting said ball means at said first inoperative position out of alignment with said aperture such that said ball means rests against said plate means and for causing said ball means to move through said aperture to said second operative position when said solenoid means moves said ball support means to said position adjacent said aperture.

3. Theft-prevention apparatus according to claim 1; in which said solenoid means includes biasing means for moving said ball support means from said position adjacent said aperture to said first inoperative position in response to movement of said shopping cart out of the proximity of said predetermined magnetic field so as to prevent movement of said ball means from said second operative position to said first inoperative position.

4. Theft-prevention apparatus according to claim 1; in which said actuator means further includes switch means actuated in response to movement of said shopping cart in the proximity of said predetermined magnetic field, and power supply means for supplying power to said solenoid means in response to actuation of said switch means.

5. Theft prevention apparatus according to claim 1; in which said one of said wheels includes, a transversely extending bore adjacent said stopper means adapted to receive a tool through which said ball means can be moved from said second operative position to said first inoperative position.

6. Theft-prevention apparatus for a shopping cart of the type having body means, a plurality of wheels and wheel support means secured to said body means for rotatably supporting said plurality of wheels, said apparatus comprising:
  a. pin means extending from one of said wheels;
  b. ball means movable between a first inoperative position and a second operative position at which said ball means is engageable with said pin means;
  c. plate means secured to said wheel support means and having a cut-out section defining an aperture;
  d. ball support means having an inclined surface for supporting said ball means at said first inoperative position out of alignment with said aperture such that said ball means rests against said plate means; and
  e. solenoid means secured to said plate means for moving said ball support means to a position adjacent said aperture in response to movement of said shopping cart in the proximity of a predetermined magnetic field to cause said ball means to move from said first inoperative position through said aperture to said second operative position, such that said ball means is wedged between said plate means and said pin means upon continued rotation of said one of said wheels to prevent further rotation thereof.

* * * * *